United States Patent
Favin et al.

[11] 4,273,970
[45] Jun. 16, 1981

[54] INTERMODULATION DISTORTION TEST

[75] Inventors: David L. Favin; Peter F. Lynn, both of Little Silver; Paul J. Snyder, Linden, all of N.J.

[73] Assignee: Bell Telephone Laboratories, Incorporated, Murray Hill, N.J.

[21] Appl. No.: 107,788

[22] Filed: Dec. 28, 1979

[51] Int. Cl.³ .............................................. H04M 3/26
[52] U.S. Cl. ............................ 179/175.3 R; 328/162; 324/57 N
[58] Field of Search ..................... 179/175.3 R, 175.3, 179/175.2 R, 2.5 R; 364/514; 324/57 N, 77 B; 328/162, 163

[56] References Cited

U.S. PATENT DOCUMENTS

| | | | |
|---|---|---|---|
| 3,305,647 | 2/1967 | Sheffet .............................. | 179/175.3 |
| 3,383,618 | 5/1968 | Engelbrecht ......................... | 328/163 |
| 3,675,138 | 7/1972 | Standing .............................. | 328/163 |
| 3,862,380 | 1/1975 | Hekimian et al. ............. | 179/175.3 R |
| 3,927,281 | 12/1975 | Bradley ........................ | 179/175.3 R |
| 3,978,401 | 8/1976 | Lum .................................... | 324/57 N |
| 4,001,559 | 1/1977 | Osborne et al. .............. | 179/175.3 R |
| 4,028,622 | 6/1977 | Evans et al. ........................ | 328/162 |

OTHER PUBLICATIONS

*Telephony*, Nov. 18, 1974, "Breakthrough in Automatic Transmission Measurement", pp. 27-37.
Bell System Technical Reference, Pub. 41008, Oct. 1971, "Analog Parameters Affecting Voiceband Data Transmission–Description of Parameters", pp. 16-24.
Bell System Technical Reference, Pub. 41009, Jan. 1972, "Transmission Parameters Affecting Voiceband Data Transmission–Measuring Techniques", p. 12.
Bell System Technical Reference, Pub. 41009, May 1975, "Transmission Parameters Affecting Voiceband Data Transmission–Measuring Techniques", pp. 17-19.

*Primary Examiner*—Gerald L. Brigance
*Attorney, Agent, or Firm*—Thomas Stafford

[57] ABSTRACT

Errors in test results are minimized in a test system (FIG. 1) employing digital data acquisition units (121) when measuring intermodulation distortion of a voice frequency communication facility (105) by employing a unique 3-tone test signal. To this end, the three tones have predetermined amplitude, frequency and phase relationships to obtain a test signal having a desired optimum probability density function which is substantially Gaussian. Additionally, circuit noise components are eliminated from the test results by obtaining a measure of noise with a single tone test signal and subtracting it out from the three tone test results. In a specific embodiment, a measure of the power spectrum resulting from the three tone signal and the power spectrum of the single tone signal are obtained, combined and utilized to obtain measurements of second and third order intermodulation distortion products compensated for noise.

10 Claims, 5 Drawing Figures

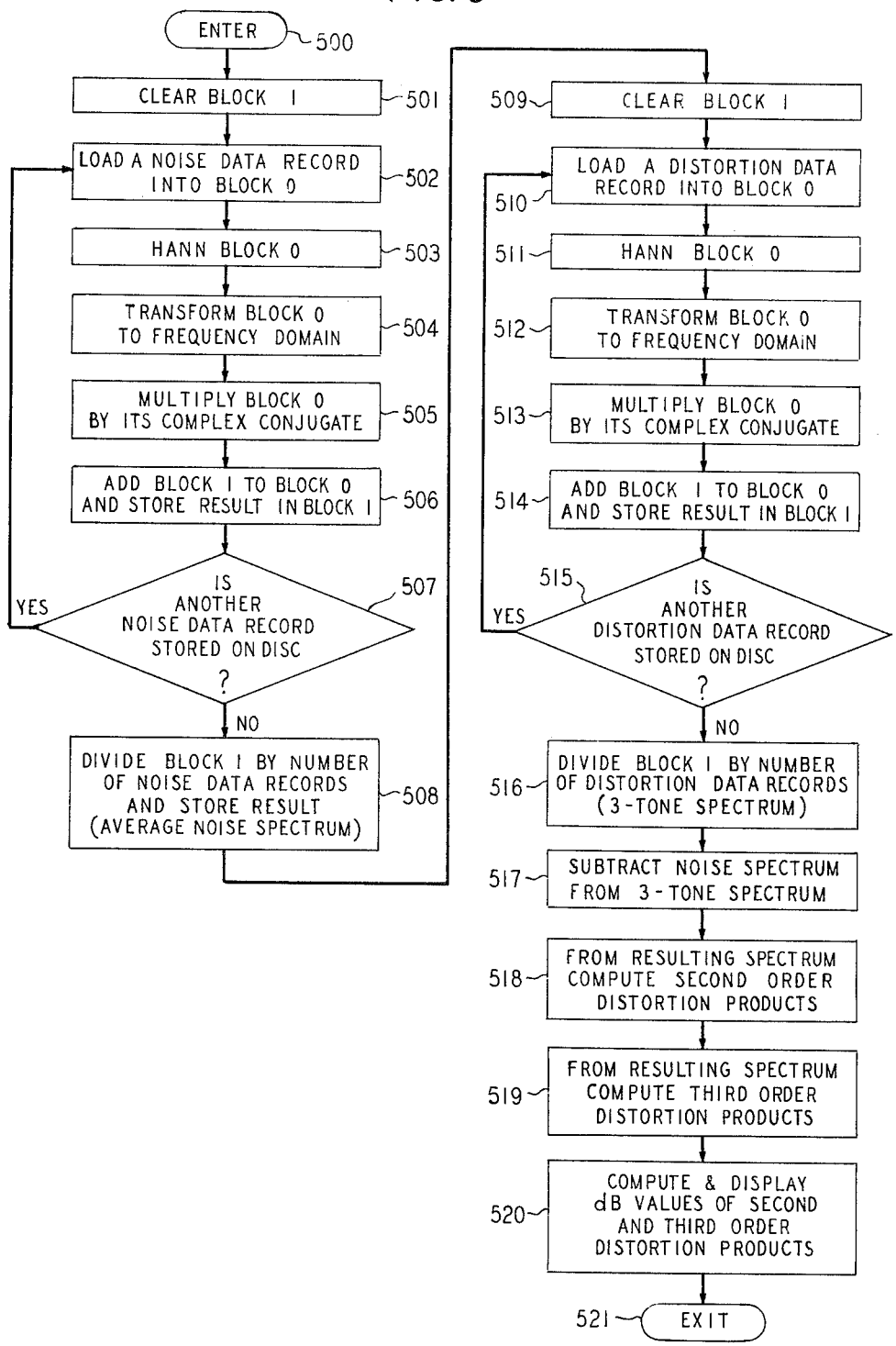

INTERMODULATION DISTORTION TEST

TECHNICAL FIELD

This invention relates to measurement of transmission parameters and, more particularly, to the measurement of nonlinear distortion in transmission of information over voiceband channels.

BACKGROUND OF THE INVENTION

Voiceband communication channels or facilities are now commonly used to transmit other than voice signals. Of particular importance is the transmission of data signals. Consequently, it is desirable to obtain simply and quickly a measure of parameters which affect the transmission of data signals over voiceband communications facilities.

One such parameter is commonly known as nonlinear distortion. As described in the Bell System Technical Reference, PUB41008, entitled "Analog Parameters Affecting Voiceband Data Transmission-Description of Parameters," dated Oct. 21, 1971, nonlinear distortion was first measured by applying a single frequency tone to a transmission facility and measuring so-called second and third order distortion products with a frequency selective voltmeter or a spectrum analyzer. However, it was found that the use of a single frequency test signal does not properly characterize the nonlinear distortion of most telecommunications facilities.

The above-noted PUB41008 also describes a technique for obtaining a measure of nonlinear distortion which utilizes a multitone test signal. For a multitone test signal, the nonlinear distortion is termed intermodulation distortion and appears as tones at frequencies which are linear combinations of the frequencies of the tones in the test signal. One example is given of a test signal consisting of three tones having equal amplitudes at three arbitrary frequencies. One problem with the use of such a multitone test signal is that the distortion products to be measured appear at a number of frequencies in the frequency band of interest. Consequently, it becomes quite burdensome to obtain a measurement since the products at all the frequencies must be determined. Moreover, use of three arbitrary tones does not yield a probability density function which properly characterizes the nonlinear distortion of communication facilities encountered in telecommunication systems.

As indicated in the Bell System Technical Reference, PUB41009, entitled "Transmission Parameters Affecting Voiceband Data Transmission-Measuring Techniques," dated January 1972, proper characterization of intermodulation distortion of a communications facility may be realized by employing a test signal including first and second narrow bands of Gaussian noise centered about a first prescribed frequency and a second prescribed frequency, respectively. This test signal is then applied to a communication facility under evaluation and the second and third order intermodulation distortion products are measured. Use of the noise bands causes the distortion products to be in prescribed frequency bands, thereby simplifying the measurement. One problem, however, with the use of noise bands in the test signal is the relatively long interval, approximately 30 seconds to one minute, required for each measurement to stabilize.

One attempt at overcoming the problems of using noise bands in the test signal employs a technique which uses four equal amplitude tones. The equal amplitude tones are arranged in first and second pairs with a predetermined frequency separation between the tones in each pair. The tone pairs are employed to simulate the noise bands used in the technique discussed in the above-noted PUB41009. The first and second tone pairs are then centered about first and second prescribed frequencies, respectively. The four-tone test signal is then applied to a facility under evaluation and second and third order intermodulation distortion products are again measured. One arrangement employing four equal amplitude tones to simulate noise bands in intermodulation distortion measurements is described in U.S. Pat. No. 3,862,380 issued to Norris C. Hekimian, et al., on Jan. 21, 1975.

It has been recognized that use of a test signal including four equal amplitude tones to obtain a measure of intermodulation distortion results in inaccuracies when applied to certain transmission facilities. In particular, problems result when applying the four-tone test signal to transmission facilities including companders. Apparently, companders tend to track slow, i.e., long term variations in the envelope of a signal being transmitted over the facility. This is referred to as tracking the syllabic rate of the transmitted signal, i.e., tracking the long term amplitude variations in the envelope of the input signal supplied to the compander. When the prior four-tone test signal is used on such transmission facilities, the so-called syllabic rate is in a frequency range that causes unwanted variations in the output signal from the compander. It has been determined that the output variations caused by the four-tone test signal are different from those caused by an actual transmitted data signal. Consequently, unwanted variations are caused in the measurement of intermodulation distortion on that facility, thereby yielding erroneous results.

Additionally, it has become increasingly desirable to employ digital techniques in the acquisition of measurement data. It has also been determined that the use of the prior four-tone test signal in measurement apparatus employing digital data acquisition requires the use of memory units having more capacity than desired. Indeed, it is desirable to employ memory units having a reasonable block size (512 words as compared to 4096) for generating the test signals and for processing signals. When using smaller memory block size and attempting to use a four tone test signal, wider frequency spacing of the intermodulation distortion products results. Consequently, the measurements are more susceptible to noise signals and the like on the transmission facility, again yielding erroneous measurement results.

Moreover, the intermodulation distortion products to be measured occur in frequency bands where background noise or other unwanted signal components (for example, quantizing noise, and the like) usually are found. Consequently, measurements employing prior apparatus include an error component proportional to the noise power in the frequency bands of interest. This error component is compensated for when using prior measurement apparatus by an operator either employing a prepared noise power chart or making a separate noise measurement and then mentally subtracting the noise power value from the measured intermodulation distortion products values.

SUMMARY OF THE INVENTION

The problem of erroneous measurement results and other problems of prior arrangements are overcome in measuring nonlinear distortion of a communication facility by employing a test signal including three individual tones having prescribed amplitude, frequency and phase relationships to realize a test signal having an optimum amplitude probability density function. The resulting probability density function of the test signal is approximately Gaussian and has reduced distortion product bandwidths as compared with the function resulting from use of a four tone test signal in a digital data acquisition system employing reasonable memory block size.

One embodiment of the invention employs a test signal including a first tone signal having a first predetermined amplitude, a first predetermined frequency and a first predetermined phase; a second tone signal having a second predetermined amplitude, a second predetermined frequency and a second predetermined phase; and a third tone signal having a third predetermined amplitude, a third predetermined frequency and a third predetermined phase. The second and third tone signals are essentially arranged in a pair of relatively close frequency spacing, while the first tone is at a frequency substantially distant from the tone pair. In an example, the first and second tones have equal amplitudes while the third tone has an amplitude less than the first and second tones and in precribed relationship thereto. The unique amplitude, frequency and phase relationships of the tone signals generate a test signal having the desired optimum probability density function.

Additionally, a test procedure is employed in an embodiment of the invention which includes measuring a power spectrum of the nonlinear distortion products plus circuit noise, measuring the power spectrum of only the circuit noise and then automatically subtracting the circuit noise to yield a compensated measurement output.

In one embodiment of the invention, remote test units, each including a data acquisition unit, are employed with a central control unit to effect test measurements. Each data acquisition unit includes arrangements for converting test signals stored in digital form to analog form and for transmitting the analog test signals over a communication facility under evaluation to another remote test unit. Additionally, each unit includes arrangements for converting received analog signals to digital form and for transmitting the digital signals to the central control unit for processing. In the central control unit, the received test signal data is used to obtain a measure of a power spectrum in accordance with a prescribed procedure and, in turn, the intermodulation distortion products of the power spectrum are employed to generate a measure of nonlinear distortion of the facility under evaluation.

In a specific procedure, a first power spectrum is obtained of a single predetermined tone signal transmitted over the facility under evaluation. Then a second power spectrum is obtained of the three-tone test signal transmitted over the facility under evaluation. The second power spectrum is divided by the first power spectrum to subtract out any unwanted noise components. Thereafter, a measure of second order intermodulation distortion is obtained by a prescribed procedure in which distortion products in predetermined frequency channels in the resulting power spectrum after noise extraction are combined, averaged and then normalized by dividing the averaged value with the total power at the first, second and third predetermined frequencies. A measure of third order intermodulation distortion is obtained by a prescribed procedure in which distortion products in predetermined frequency channels in the resulting power spectrum after noise extraction are summed and normalized by dividing with the total power at the first, second and third predetermined frequencies.

BRIEF DESCRIPTION OF THE DRAWING

The invention will be more fully understood from the following detailed description of an illustrative embodiment taken in connection with the appended drawing in which:

FIG. 5 is a flowchart of a program routine illustrating a sequence of steps employed in utilizing the test data obtained in the routine of FIG. 4 to obtain desired test measurement results, in this embodiment, measurements of intermodulation distortion.

DETAILED DESCRIPTION

Figure 1:
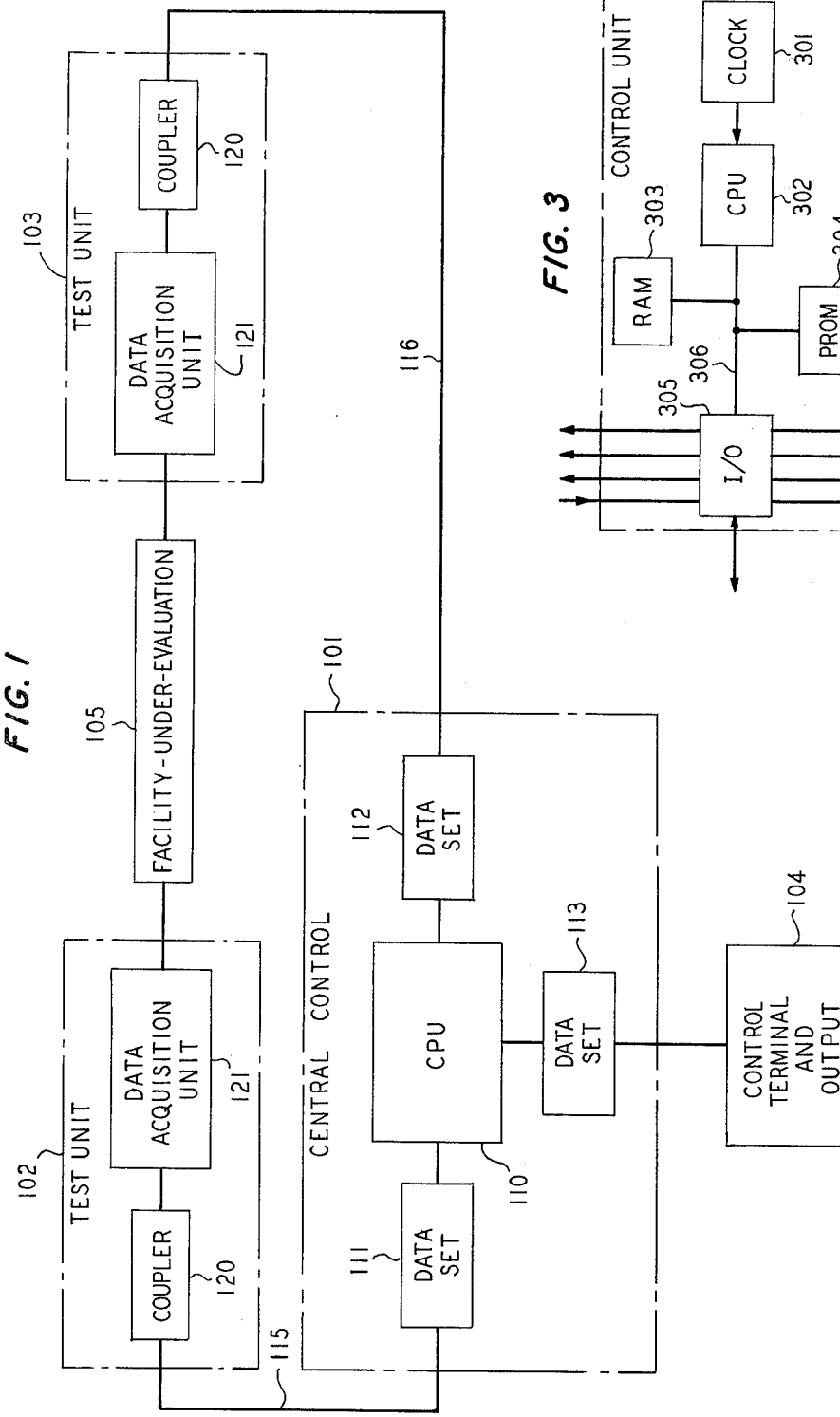
FIG. 1 shows in simplified block diagram form an arrangement including an embodiment of the invention for obtaining measurements in accordance with an aspect of the invention.

FIG. 1 shows in simplified block diagram form a system arrangement which is advantageously utilized to make intermodulation distortion measurements in accordance with one embodiment of the invention. Accordingly, shown is central control 101, first remote test unit 102, second remote test unit 103, control terminal and output unit 104 and facility under evaluation 105. Test units 102 and 103 are adapted for being connected to facility under evaluation 105 and to central control 101. Facility 105 may be a communications link, for example, a voice frequency telephone line, or the like.

Central control 101 includes, in this embodiment, computer 110, data set 111 for transmitting and receiving information in digital form to and from, respectively, test unit 102, data set 112 for transmitting and receiving information in digital form to and from, respectively, test unit 103 and data set 113 for transmitting and receiving information in digital form to and from, respectively, control terminal 104.

Computer 110 may be any of the general purpose computers known in the art and includes associated core and disc memory units. Preferably, computer 110 includes a 2100S series Hewlett-Packard (H-P) computer which contains in memory a 5451B Fourier Analyzer Software System commercially available from Hewlett-Packard. Operation of the 2100 series Hewlett-Packard Computer is described in Hewlett-Packard Computer Reference Manual No. 02100-90001 dated Dec. 1, 1971, and also in H-P Installation and Maintenance Manual No. 02100-90002 dated April 1973. The disc memory unit, which in this example is an H-P 7900A (not shown), is described in the H-P Disc 7900A Disc Drive Operating and Service Manual No. 07900-9002. Similarly, the 5451B software is described in Fourier Analyzer System 5451B Manual No. 05451-90199 dated August 1974, with Supplements No. 05451-90268 dated March 1975 and No. 05451-90411 dated May 1976. For subroutines available in the 5451B system and their use, also see "Hewlett-Packard Fourier Analyzer Training Manual-Application Note 140-0" and the "Fourier Analyzer 5451B Keyboard Command Manual," dated October 1973.

Data sets 111 and 112 are identical. In this example, they are 202C type data sets which transmit and receive at 1200 baud and are commercially available from Western Electric Company. Similarly, data set 113 is, in this example, a 103 type data set which transmits and receives at 300 baud and also is commercially available from Western Electric.

Control terminal and output unit 104, in this example, is a Texas Instruments Model 745 Terminal. The individual program routines in the 5451B Fourier Analyzer Software System are initiated by commands entered on terminal 104 keyboard as described in the above noted "Keyboard Command Manual," or, alternatively, by programs stored on the disc memory and retrieved under control of an operating system program.

Thus, as shown, central control 101 is adapted to be connected via communications facilities 115 and 116 to test units 102 and 103, respectively. Facilities 115 and 116 may be, for example, Direct Distance Dialing (DDD) communications facilities.

Test units 102 and 103 are identical, both including coupler 120 and data acquisition unit 121. Coupler 120 is an acoustically coupled modem, for example, an Anderson-Jacobson Model ADC 1200 and is employed to acoustically couple test units 102 and 103 via DDD facilities 115 and 116 to central control 101.

Details of one system which may be employed for the arrangement shown in FIG. 1, are disclosed in U.S. Pat. No. 4,001,559 issued Jan. 4, 1977.

At the outset, is should be noted that it is contemplated and anticipated that in other applications, and/or embodiments of the invention, the functions of central control 101 be included in remote test units 102 and 103, thereby eliminating the need for central control 101. In such an arrangement the intelligence of central control 101 would have to be included in the remote test units via additional processing and memory capabilty. Additionally, other embodiments of the invention may include hardware signal generators and receivers similar to those disclosed in U.S. Pat. No. 3,862,380 noted above.

Figure 3:
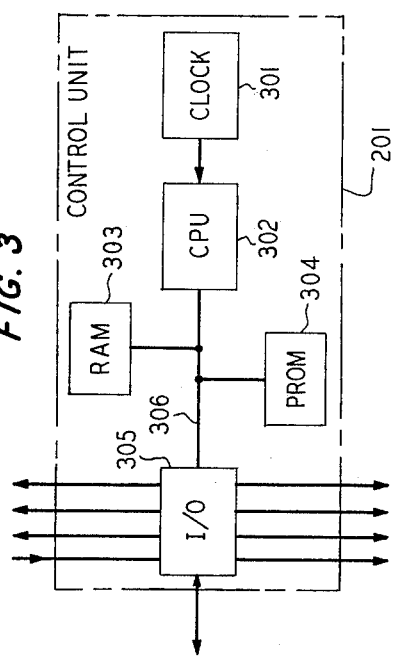
FIG. 3 illustrates in simplified block diagram form details of a control unit employed in the data acquisition unit shown in FIG. 2.
Figure 2:
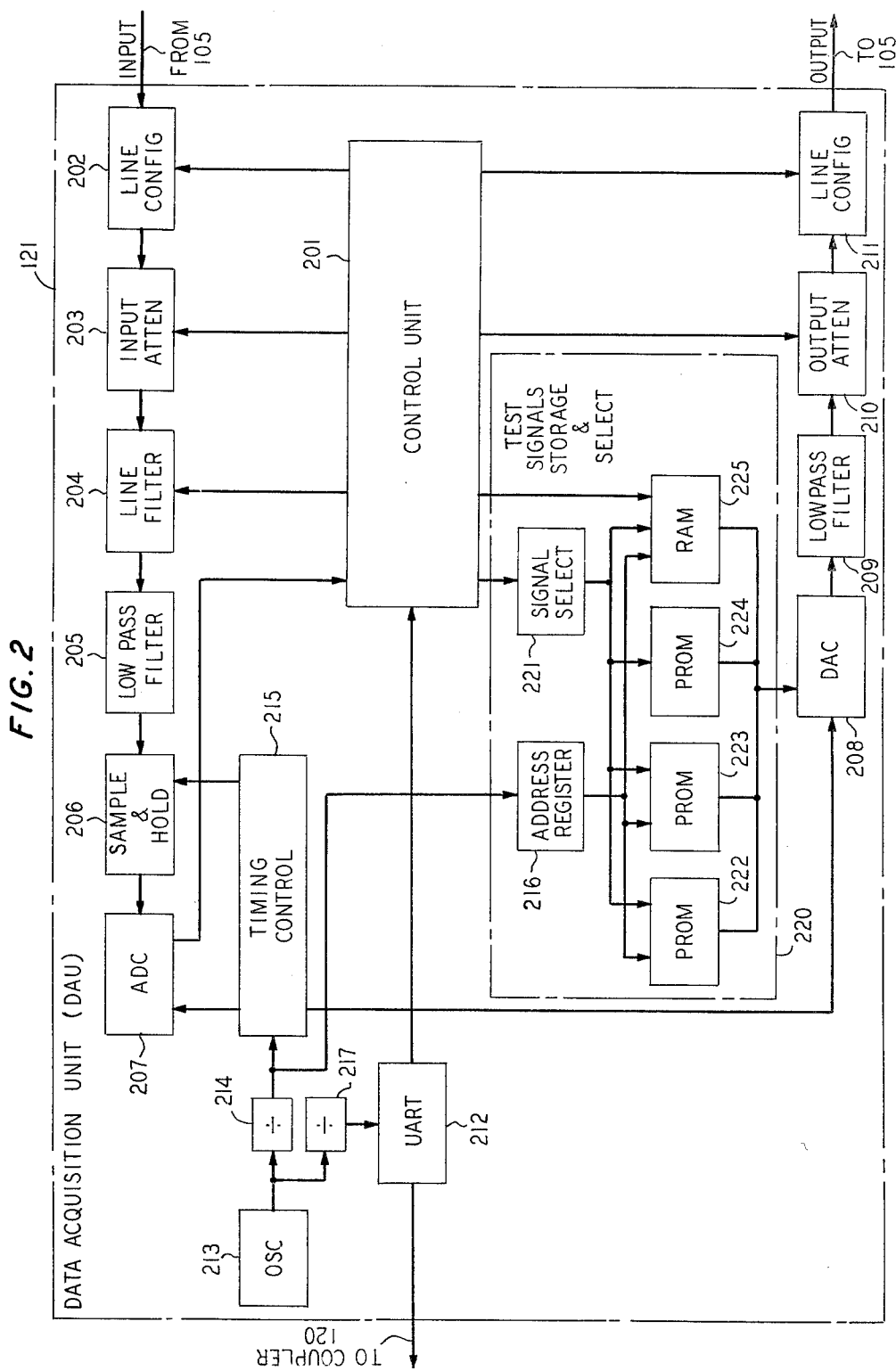
FIG. 2 depicts in simplified block diagram form details of a data acquisition unit employed in the test units of FIG. 1.

FIG. 2 shows in simplified block diagram form details of data acquisition unit (DAU) 121. Accordingly, shown is control unit 201, which is a microcomputer system as shown in FIG. 3 and described below. Control unit 201 is employed to control the configuration and operation of DAU 121 for transmitting and receiving information to and from, respectively, facility under evaluation 105 and central control 101.

DAU 121 has an input adapted to be connected to facility under evaluation 105 and an output also adapted to be connected to facility 105, both under control of control unit 201 in response to commands from central control 101.

An input or receive section of DAU 121 includes line configuration unit 202, input attenuator 203, line filter 204, low pass filter 205, sample and hold 206 and analog-to-digital converter (ADC) 207.

Similarly, an output or transmit section of DAU 121 includes digital-to-analog converter (DAC) 208, low pass filter 209, output attenuator 210 and line configuration unit 211.

Signals are supplied from and to unit 121 via universal asynchronous receiver transmitter (UART) 212 and coupler 120 to and from, respectively, central control 101. In this example, a Western Digital 1602R UART is employed.

Oscillator 213 in conjunction with divider 214 generates a first timing signal which is supplied to timing control 215 and address register 216. In this example, the first timing signal is the digital sampling rate and is 8 kHz. Similarly, oscillator 213 in conjunction with divider 217 generates a second timing signal for driving UART 212, in this example, 19.1 kHz.

Timing control 215 includes a plurality of timing circuits (not shown), for example, monostable circuits connected in tandem to generate a desired sequence of pulse signals for controlling sample and hold 206, ADC 207 and DAC 208. In this example, an incoming analog test signal is sampled prior to being converted to digital form.

Line configuration units 202 and 211 are identical and are employed under control of unit 201 to select input and output impedance values, respectively, in this example, either 600 ohms or 900 ohms.

Input attenuator 203 includes a plurality of programmable attenuators (not shown) capable of inserting under control of unit 201 attenuation in prescribed steps into the input channel of DAU 121. In an example from experimental practice, 3 dB attenuation steps are employed. Specifically, a plurality of high gain amplifiers, commonly referred to as operational amplifiers, having controllable gain responsive to digital signals from control unit 201, are employed for this purpose in well-known fashion.

Output attenuator 210 is essentially identical to input attenuator 203, except that the attenuation adjustment in this example is in 1 dB steps.

Line filter 204 is selected under control of control unit 201, depending on the specific type of test being run; in this example, filter 204 is of a type having a flat amplitude versus frequency characteristic over the voice frequency band, e.g., from DC through 3600 Hz. The filter selection is realizable in well-known fashion, for example, by enabling the input of an active filter having the desired amplitude versus frequency characteristic.

Low pass filters 205 and 209 are identical and are active resistor-capacitor active filters forming an 8 pole, low pass filter configuration. Such a filter is realizable by employing four so-called biquad active filters in tandem. A typical biquad active filter circuit is described in U.S. Pat. No. 3,919,658 issued to J. J. Friend on Nov. 11, 1975.

Sample and hold 206 is employed to controllably sample a received analog signal. In an example from experimental practice, a Burr-Brown SHM 60 sample and hold unit is employed for this purpose.

The sampled signal held in sample and hold 206 is converted into digital form via ADC 207. In this example, the analog signal sample is converted into a 12 bit digital signal by employing a Burr-Brown ADC 85-12.

As indicated above, timing control 215 generates signals at the 8 kHz rate for operating sample and hold 206 prior to the digital conversion in ADC 207.

DAC 208 is a 12 bit digital-to-analog converter for converting 12-bit digital signals from test signal storage and select circuit 220 into an analog test signal. In this example, a zero-order hold Burr-Brown DAC 85-CBI-V is employed for this purpose.

Test signal storage and select circuit 220 includes address register 216, signal select circuit 221, programmable read-only memories (PROMs) 222, 223 and 224 and read-write memory, commonly referred to as RAM 225. It is anticipated that in commercial use the PROMs will be replaced by ROMs and that additional memory units may be employed, depending on the type and number of test signals to be generated. Although shown as single units, each of PROMs 222 through 224 includes two 8-bit PROM units, each used to store 6-bit words, thereby forming 12-bit memory units. Similarly, RAM 225 is also a 12-bit storage arrangement. RAM 225 is intended for use in storing any test signal to be supplied from central control 101 (FIG. 1). In this particular test example, RAM 225 is not employed.

Address register 216, in response to the second timing signal from divider 214 (8 kHz), continuously generates a sequence of addresses corresponding to the addresses of buffer stages in PROMs 222, 223 and 224 and RAM 225 in well-known fashion. Thus, the buffer stages of a selected PROM or RAM memory unit are continuously sequenced through.

Signal select unit 221 includes a binary coded decimal to decimal decoder unit (not shown) which, under control of control unit 201, selects a particular one of PROMs 222, 223 or 224 or RAM 225 to be employed for generating a specific test signal. Digital outputs from PROMs 222, 223 and 224 and RAM 225 are supplied to DAC 208 for conversion into an analog test signal.

In this example, PROMs 222 and 223 are employed to store digital representations of test signals intended to be employed for obtaining a measure of intermodulation distortion of facility 105 in accordance with an aspect of the invention. To this end, PROM 222 stores digital representations of signal amplitudes for generating, in conjunction with DAC 208 and low pass filter 209, an analog single frequency test signal. This single frequency signal is employed in this embodiment of the invention, as will be discussed below, to obtain a measure of circuit noise. In an example from experimental practice, a test frequency of 1015.625 Hz corresponding to channel 65 is employed for this purpose. Hereinafter, this signal shall be referred to as 1016 Hz. In the instant example, frequency separation between channels is 15.625 Hz. The usual 1,000 Hz test tone widely employed in telephone systems cannot be utilized for this noise test because it is a subharmonic of the T-carrier rate.

PROM 223 stores digital representations of signal amplitudes for generating, in conjunction with DAC 208 and low pass filter 209, a test signal having three tones. As indicated above, the three tones have unique amplitude, frequency and phase relationships to generate, in accordance with an aspect of the invention, a test signal having a desired optimum probability density function which is approximately Gaussian.

To this end, the test signal includes a first tone (A) having a first amplitude, for example, of relative value of unity, which corresponds to the maximum allowable output when combined with the remaining tones in the test signal, a first frequency, for example, of 859.375 Hz corresponding to channel 55 and a first phase of, for example, 0 degrees; a second tone (B) having a second amlitude, for example, of relative value of unity, a second frequency substantially separated from the first frequency, for example, 1359.375 Hz corresponding to channel 87 and a second phase of, for example, 90 degrees; and a third tone (B+3Δ) having a third amplitude lower than the first and second amplitudes by at least a prescribed amount, for example, relative value of 0.7079 unity, (−3 dB relative to A and B), a third frequency substantially close to the second frequency of, for example, 1406.25 Hz corresponding to channel 90, thereby forming a tone pair with signal B, and a third phase of, for example, 180 degrees. Signal amplitude for the third signal may be less than the 3 dB value, for example, an amplitude of −6 dB has also been employed. The −3 dB value, however, appears to yield optimum results.

Digital representations of the single tone test signal and the three tone test signal are generated in well-known fashion for storage in PROM 222 and PROM 223, respectively. In this example, the digital signal representations stored in PROM and/or RAM memory are optimized for the specific unit employed for DAC 208, in this example, a Burr-Brown DAC 85-CBI-V. An 8 Hz sampling rate and 512 twelve bit samples per "record" are employed. This allows for generation of time signals containing one or more frequencies in the 15.625 Hz to 4 kHz range in 15.625 Hz increments. Twelve bit samples are generated which are separated into two parts, namely, 6 least significant bits and 6 most significant bits. Each test signal is normalized to a reference signal containing a single tone to maximize output power from DAC 208 and at the same time differs from the reference signal power by integer dB values. Output attenuator 210 then corrects for the different power levels and provides for transmitting specified power levels in the integer steps, for example, of 1 dB.

Digital representations corresponding to signal amplitude samples to be stored are readily obtained knowing: (1) the number of tones (1 to 256) in the signal; (2) the channel number of the reference frequency; and (3) the peak amplitude (volts), frequency channel, and phase (degrees) for each tone. In this example, a channel number of a tone (1 to 256) is equal to the frequency in hertz divided by the frequency resolution (15.625 Hz).

Maximum output power for a signal that contains only the reference frequency is obtained, taking into account the aperture distortion of zero-order hold DAC 208, according to the equation:

$$F_0(\omega) = \frac{\sin(\pi\omega/\omega_S)}{\pi\omega/\omega_S} F_i(\omega)\exp^{-j\omega T/2} \quad (1)$$

where
T = ⅛ kHz = 125 μs sampling interval,
ω = radian frequency,
$\omega_S$ = radian sampling frequency,
$F_i(\omega)$ = DAC input level, and
$F_0(\omega)$ = DAC output level.

The value 4.99756 is the maximum voltage that DAC 208 can accommodate without overloading. It is an approximation of the voltage $V_{FS}$−1 LSB, where $V_{FS}$ is the full scale voltage of the DAC (5 volts) and 1 LSB is the quantization step size, 2 $V_{FS}$/4096.

Amplitudes of the tones are now adjusted so that the total adjusted output power of DAC 208 is equal to the output power from a signal that contains only the reference frequency.

Amplitude and phase values of the individual tones are pre-equalized to compensate for the aperture distortion, i.e., amplitude and phase versus frequency characteristics, of DAC 208 according to Equation (1) above.

The test signal is now sampled according to the equation:

$$Y(n) = \sum_{K=1}^{N} A(K)\cos[\omega(K)nT + \phi(K)], \quad (2)$$

$$n = 0, 1, \ldots, 511$$

where
$\phi$ = phase,
N = number of tones in signal, and
T = ⅛ kHz = 125 μs sampling interval.

Each sampled value is checked to make sure it does not exceed the maximum level allowed by DAC 208 (±4.99756). If it does, the power of the signal is reduced by 1 dB, the new tone amplitudes are computed, and the signal is resampled. The above process is repeated until all of the sampled values are within DAC 208 power requirements.

Each sampled value is quantized for 12 bit comlementary offset binary code according to the equation:

$$X(n) = [(N/2 - 1) - N/2[Y(n)/V_{FS}]] \quad (3)$$

where
$V_{FS}$ = DAC full-scale output voltage,
1LSB = 2 $V_{FS}/N$ = quantization step size,
N = $2^b$ = number of quantizing steps,
b = converter resolution,
X(n) = quantized amplitude sample, and
Y(n) = signal sampled amplitude.

For a 12 bit converter with a full-scale voltage of 5 volts, Equation (3) reduces to:

$$X(n) = 2047 - 409.6Y(n) \quad (4)$$

The quantized values are then rounded off to the nearest 4-digit integer and converted to a 4-digit octal word which is then separated into two parts, one part representing the 6 least significant bits (LSB) and the other part representing the 6 most significant bits (MSB) of each 12 bit word. The resultant 12 bit words are stored in buffers of a corresponding one of PROMS 222–224 or RAM 225 for use later in generating desired test signals.

FIG. 3 shows in simplified block diagram form details of control unit 201. Accordingly, shown are clock 301, central processing unit (CPU) 302, read-write memory, commonly called RAM 303, programmable read only memory (PROM) 304, and input/output (I/O) 305. Clock 301 generates timing signals for CPU 302 in well-known fashion. CPU 302, RAM 303, PROM 304 and I/O 305 are interconnected via bus 306 to form a microcomputer system. CPU 302 may be any of numerous computer arrangements known in the art. In this example, an Intel 8080A unit it utilized with associated compatible circuit elements. The 8080A, its operation and programming are described in "Intel 8080 Microcomputer Systems Users Manual," dated September 1975. It should be noted that microcomputer arrangements, including the desired configuration of control unit 201, are available as a single unit, for example, the Intel 8741.

A program is stored in PROM 304 of control unit 201 for controlling operation of data acquisition unit 121 and, hence, test units 102 or 103 in response to commands from central control 101. Thus, control unit 201 accepts commands supplied from central control 101 via coupler 120 and UART 212, decodes and executes the commands. A list of preferable commands are set out below. The specific procedure for decoding the executing the commands will be apparent to those skilled in the art.

Briefly, when either test unit 102 or 103 is functioning as a receiver, control unit 201, in response to appropriate commands, connects the input port of DAU 121 to facility 105, sets line configuration 202 to a proper impedance or termination, adjusts input attenuator 203 to a desired or specific value, sets line filter 204 to a specific filter configuration and stores in RAM 303 (FIG. 3) 512 twelve-bit digital representations designated a record of a received test signal. The running average of Y data records is stored in RAM 303, the number Y being dependent on the type of test being performed. The individual records are thereafter transmitted to central control 101 via UART 212 and coupler 120 (FIG. 1) for use in obtaining a test result in a manner to be described below. Similarly, when either test unit 102 or 103 is used as a transmitter, control unit 201, in response to appropriate commands from central control 101 connects the output port of DAU 121 to facility 105, sets line configuration 211 to a desired impedance or termination, adjusts output attenuator 210 to a desired value and causes 512 twelve-bit test signal samples to be supplied in sequence from test signal storage and select circuit 220 to DAC 208 for generating a corresponding analog test signal. Depending on the particular test being performed, each test unit can be operating as either a receiver or a transmitter.

A list of typical commands for test units 102 and 103, including the characters, are shown below. An "x" adjacent to the command indicates type of command, immediate or string; and number of characters, i.e., 1 or 2. In this example, the commands are in ASCII code. Specifically, 6 bit stripped ASCII is employed and, then, only those characters included in the so-called "dense" ASCII set.

| COMMAND | COMMANDS TYPE COMMAND | | CHARACTERS IN COMMAND | | CHARACTERS | |
|---|---|---|---|---|---|---|
| | IMMEDIATE | STRING | 1 | 2 | 1st | 2nd |
| ATTENTION | x | | x | | $\phi$ | |
| SELF TEST | x | | x | | 1 | |
| SEND SAMPLES | x | | x | | 2 | |
| STOP GENERATOR | x | | x | | 3 | |
| RETRANSMIT STATUS | x | | x | | 4 | |
| END I/O | x | | x | | 5 | |
| LOAD TRANSMIT BUFFER | x | | | x | 6 | Binary $\phi$ Binary 1 |
| START STRING | | x | | x | 7 | Binary 1 thru 5 |

-continued

| COMMAND | TYPE COMMAND | | CHARACTERS IN COMMAND | | CHARACTERS | |
|---|---|---|---|---|---|---|
| | IMMEDIATE | STRING | 1 | 2 | 1st | 2nd |
| STRING ENABLE | x | | | x | 8 | Binary $\phi$ thru 5 |
| START I/O | x | | | x | Ⓐ | Binary $\phi$ thru 9 |
| ADC RANGE | | x | x | | A | |
| DELAY | | x | | x | D | Binary 1 thru 63 |
| END STRING | | x | x | | E | |
| FILTER | | x | | x | F | Binary $\phi$ or 1 |
| GENERATE | | x | | x | G | Binary $\phi$ thru 63 |
| INPUT ATTN | | x | | x | I | Binary $\phi$ thru 15 |
| LINE CONFIGURATION | | x | | x | L | 6-Bit Byte |
| OUTPUT ATTN | | x | | x | O | Binary $\phi$ thru 5$\phi$ |
| SAMPLE | | x | | x | S | Binary 1 thru 16 |
| WAVEFORM SELECT | | x | | x | W | Binary $\phi$ Binary 1 Binary 2 |

A detailed description of the immediate commands follows:

Attention ($\phi$) is a 1-character command that causes test unit 102 or 103 to generate audio and visual signals informing an operator to contact central control 101.

Self Test (1) is a 1-character command that initiates a sequence of self-test procedures for test unit 102 or 103 and transmits the self-test status to central control 101.

Send Samples (2) is a 1-character command that instructs test unit 102 or 103 to transmit data samples (records) from RAM 303 to central control 101.

Stop Generator (3) is a 1-character command that instructs test unit 102 or 103 to disable its transmitter.

Retransmit Status (4) is a 1-character command that instructs test unit 102 or 103 to transmit the current data status information to central control 101. It provides for resending the "data status" response for the case where it is received with errors or is not received at all. This could prevent the need for resending all of the data samples, which is time-consuming.

End I/O (5) is a 1-character command that terminates all communication with test unit 102 or 103. Communication is re-established when test unit 102 or 103 receives a valid "start I/O" command.

Load Transmit Buffer (6+From Where) is a 2-character command. The first character is a 6; the second character instructs test unit 102 or 103 to load data into the transmit buffer, i.e., RAM 225, from modem 120 (binary $\phi$) or from RAM 303 (binary 1).

Start String (7+String Number) is a 2-character command that instructs test unit 102 or 103 that, following this command, a series of commands will be sent that are to be stored in RAM 303. The second character of the command represents the string identification, A through E, using binary 1 through binary 5, respectively.

String Enable (8+String Number) is a 2-character command that instructs test unit 102 or 103 to execute the string program represented by the second character of the command. Programs A through E correspond to binary 1 through binary 5, respectively.

Start I/O (Control A+Address) is a 2-character command that informs test unit 102 or 103, having an address given in the second character of the command, to expect more commands from central control 101. The second character of the command can be a binary number from zero to nine. This number corresponds to the decimal number selected by a rotary switch on the front panel of test unit 102 or 103. When a valid "start I/O" command is received, test unit 102 or 103 performs initialization procedures that prepare test unit 102 or 103 to accept data or commands from central control 101. The "start I/O" command cannot interrupt the operation of a string program or the loading of data. Central control 101 must wait until these operations are complete before sending this command. The signal generator is disabled if it happens to be generating when the "start I/O" command is received by test unit 102 or 103.

A detailed description of string commands follows:

ADC Range (A) is a 1-character command that instructs test unit 102 or 103 to auto-range its input attenuators for an optimum signal level for analog-to-digital conversion.

Delay (D+N Records) is a 2-character command that instructs test unit 102 or 103 to generate a time delay equal to the integer number N record lengths. The value of N can range from 1 to 63 and is coded in a 6-bit byte having binary values from 1 to 63, respectively.

End String (E) is a 1-character command that is recognized by test unit 102 or 103 as the string sequence terminator.

Filter-Select (F+Which One) is a 2-character command that instructs test unit 102 or 103 to select one of two line filters. Line filter 204 is coded in the 6-bit byte of the second character. Filter 204 in this example has a loss equal to the flat loss of filter 205 and is selected by the second character being binary $\phi$.

Generate (G+N Times) is a 2-character command that instructs the transmitter to generate N repetitions (records), of the waveform selected, with DAC 208 and then stop. If N is zero, the transmitter will continue to generate until told to stop by the "stop generator" command. The value of N can range from 0 to 63 and is coded in a 6-bit byte, having binary values from 0 to 63, respectively. When the "generate" command is being executed as part of a string program, the number of repetitions N are externally controlled from control 201 of test unit 102 or 103 so that control 201 is free to do other chores. The "start I/O" command, as well as the "stop generator" command, will stop the generator.

Input Attentuator (I+Attentuation) is a 2-character command that instructs test unit 102 or 103 to set input attenuator 203 to a fixed value, in 3 dB increments. The second character of the command specifies the input attenuator settings with a 6-bit byte. Input attenutator settings corresponding to values from 0 dB to 45 dB, in 3 dB increments, are represented with binary values from 0 to 15, respectively.

Line Configuration (L+Type Configuration) is a 2-character command that instructs test unit 102 or 103 to set its terminal conditions in accordance with the bit values of a 6-bit byte of the second character. The bit values and functions are as shown below. Reference to transmit or receive terminals means those terminals that are normally used for transmitting or receiving.

| Bit Position | Bit Value | Function |
|---|---|---|
| 1 | φ | Normal. |
|   | 1 | Connect Transmitter to Receive Terminals and Receiver to Transmit Terminals. |
| 2 | φ | Provide 600 ohm Transmit and Receive Impedance. |
|   | 1 | Provide 900 ohm Transmit & Receive Impedance. |
| 3 | φ | Normal. |
|   | 1 | Loop Line - Connect Transmit Line to Receive Line (through input amplifier and output attenuator). |
| 4 | φ | Normal. |
|   | 1 | Loop Set - Connect Transmitter Output to Receiver Input. |
| 5 | φ | Normal. |
|   | 1 | Connect Receiver Input for Noise to Ground Measurements. |
| 6 | φ | Provide for Terminating Impedance at Receiver Input. |
|   | 1 | Provide for DC Measurements at Receiver Input. |

Output Attenuator (O+Attenuation) is a 2-character command that instructs the transmitter to set output attenuator 210. Output attentuator 210 has a range from 0 to 50 dB, in 1 dB steps. The second character of the output attenuator command specifies the output attenuation with a 6-bit byte. Output attenuation values from 0 to 50 dB are represented by consecutive binary values from 0 to 50, respectively.

Sample (S+Y Records) is a 2-character command that instructs test unit 102 or 103 to sample Y successive records. Corresponding sampled values in each record are added together algebraically and averaged. The value of Y can be any number from 1 to 16 and is coded in a 6-bit byte having binary values from 1 to 16, respectively. Each sampled value is checked for an overload condition during sampling.

Waveform Select (W+Which Waveform) is a 2-character command that instructs test unit 102 or 103 to select one of two different waveforms according to the value of the second character which represents a 6-bit byte having a value of binary 1 or 2, namely, 1016 Hz and 3-tone, respectively.

| Binary Value | Waveform |
|---|---|
| 1 | 1016 Hz PROM. |
| 2 | 3-Tone PROM. |

Several modes of testing are possible at and between test units 102 and 103, namely, straightaway measurements from one test unit to the other, loop test unit measurements where the transmit and receiver circuits of a unit are interconnected through a circuit (not shown) in DAU121, loopback measurements where the transmit port and receive port of a single test unit are connected through an external network and loop line measurements where, for example, a 4-wire facility is looped at the far end by a circuit (not shown) in the far end test unit.

By way of example, the following commands are sent from central control 101 to test units 102 and 103 to effect straightaway testing of facility 105 for noise with tone and intermodulation distortion. The test results are employed as described below to obtain compensated measurements of second and third order intermodulation distortion products. Either of test units 102 or 103 may be employed as a transmitter or receiver. In this example, test unit 102 is employed as a transmitter and test unit 103 is employed as a receiver.

Commands for noise with tone test and an explanation are as follows:

| COMMANDS | EXPLANATION |
|---|---|
| Ⓐ | START I/O |
| XR | TEST UNIT 103 ADDRESS |
| 7A | TRANSMIT PROGRAM A |
| LX |  |
| F@ | PROGRAM A |
| IO |  |
| E | END STRING |
| 8A | EXECUTE PROGRAM A |
| 7B | TRANSMIT PROGRAM B |
| A | PROGRAM B |
| E | END STRING |
| 7C | TRANSMIT PROGRAM C |
| SA | PROGRAM C |
| E | END STRING |
| Ⓐ | START I/O |
| XT | TEST UNIT 102 ADDRESS |
| 7D | TRANSMIT PROGRAM D |
| LX |  |
| OX | PROGRAM D |
| WA |  |
| G@ |  |
| E | END STRING |
| 8D | EXECUTE PROGRAM D |
| Ⓐ | START I/O |
| XR | TEST UNIT 103 ADDRESS |
| 8B | EXECUTE PROGRAM B |
| *8C | EXECUTE PROGRAM C |
| *2 | TRANSMIT RECORD |
| Ⓐ | START I/O |
| XT | TEST UNIT 102 ADDRESS |
| 3 | STOP TRANSMITTER |

Steps between asterisks (*) are repeated for each additional data record collected.

Commands for three tone test and an explanation are as follows:

| COMMANDS | EXPLANATION |
|---|---|
| Ⓐ | START I/O |
| XR | TEST UNIT 103 ADDRESS |
| 7A | TRANSMIT PROGRAM A |
| LX |  |
| F@ | PROGRAM A |

| COMMANDS | EXPLANATION |
| --- | --- |
| IO | |
| E | END STRING |
| 8A | EXECUTE PROGRAM A |
| 7B | TRANSMIT PROGRAM B |
| A | PROGRAM B |
| E | END STRING |
| 7C | TRANSMIT PROGRAM C |
| SA | PROGRAM C |
| E | END STRING |
| Ⓐ | START I/O |
| XT | TEST UNIT 102 ADDRESS |
| 7E | TRANSMIT PROGRAM E |
| LX | |
| OX | PROGRAM E |
| WB | |
| G@ | |
| E | END STRING |
| 8E | EXECUTE PROGRAM E |
| Ⓐ | START I/O |
| XR | TEST UNIT 103 ADDRESS |
| 8B | EXECUTE PROGRAM B |
| *8C | EXECUTE PROGRAM C |
| *2 | TRANSMIT RECORD |
| Ⓐ | START I/O |
| XT | TEST UNIT 102 ADDRESS |
| 3 | STOP TRANSMITTER |

Steps between asterisks (*) are repeated for each additional data record collected.

It will be apparent to those skilled in the art that each of test units 102 and 103 communicates reception of valid commands and its status to central control 101.

Figure 4:
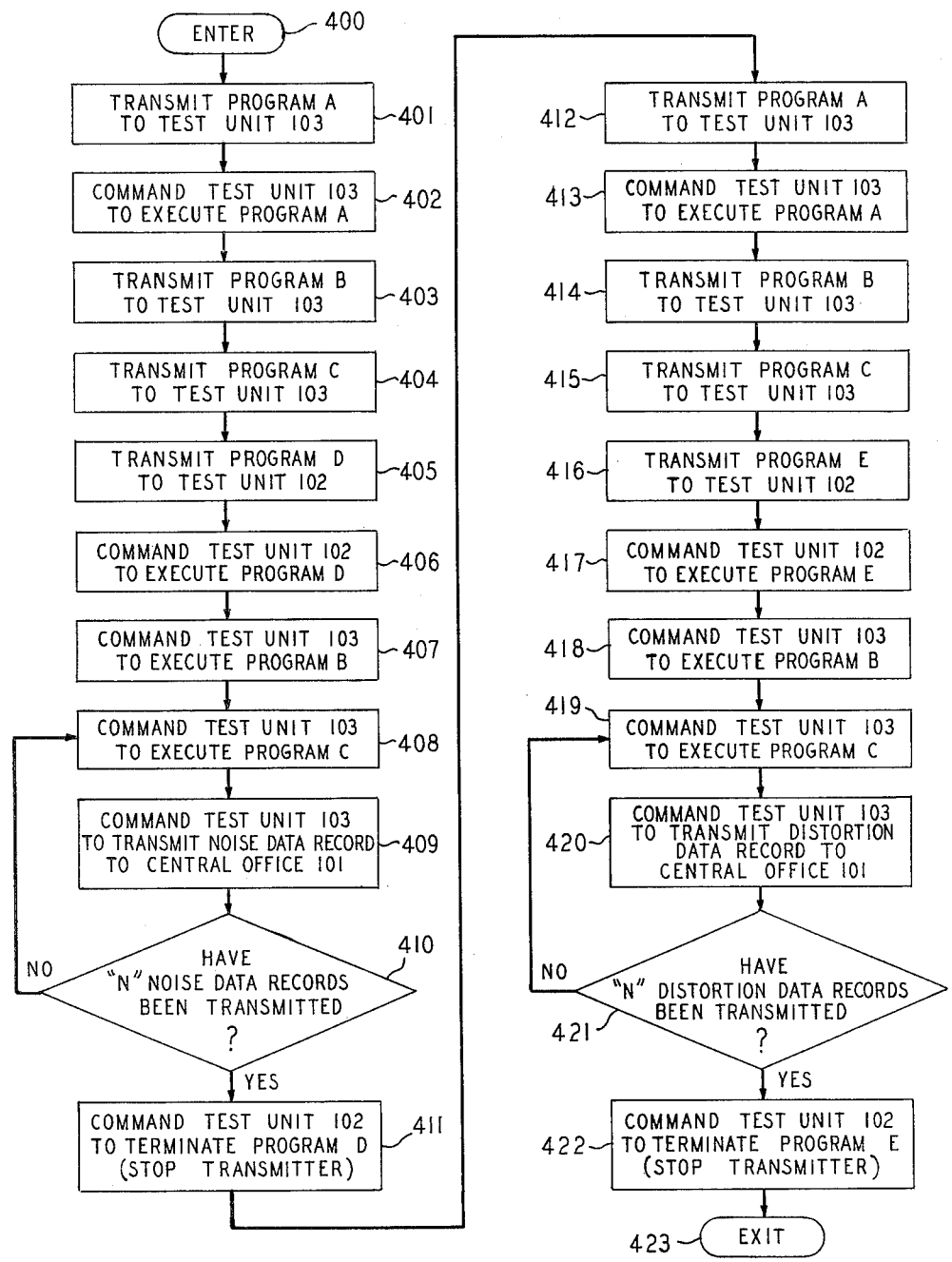
FIG. 4 shows a flowchart of a program routine illustrating a sequence of steps employed in one embodiment of the invention for obtaining test data in the system of FIG. 1.

FIG. 4 shows a flowchart of a program routine of steps performed in gathering data to be used in obtaining a measure of noise with tone and intermodulation distortion employing a 3-tone signal. The program is essentially the commands set out above, which are stored in RAM 303 of control unit 201 in test unit 102 or test unit 103.

Consequently, test units 102 and 103 are configured into transmitting and receiving units to effect the desired measurements. It will be apparent to those skilled in the art from the above information how to generate a program listing.

The flowchart shown in FIG. 4 includes three different symbols: the oval symbols indicate the beginning and ending of the routine; the rectangular symbols, commonly referred to as operational blocks contain the description of a particular detailed operational step; and the diamond symbols, commonly referred to as control branch points, contain a description of a test performed by control unit 201 for enabling it to determine the next operation to be performed.

As shown in FIG. 4, the test data acquisition procedure routine is entered at oval 400. Operational block 401 causes central control 101 to transmit program A, as set out above, to test unit 103. Program A includes a string of commands, as set out above, for setting line configuration unit 202 to a desired impedance, i.e., 600 ohms or 900 ohms; input attenuator 203 to a prescribed mid-range value; and line filter 204 to a specific filter configuration as set out above.

Operational block 402 causes central control 101 to transmit a command to test unit 103, instructing it to execute program A. Thus, the receiver input characteristics are set.

Operational block 403 causes central control 101 to transmit program B, as set out above, to test unit 103. Program B controls auto-ranging of input attenuator 203 to optimize the incoming signal level to the maximum allowed level without overloading ADC 207.

Operational block 404 causes central control 101 to transmit program C, as set out above, to test unit 103. Program C controls ADC 207 to take one (Y=1) 512 twelve-bit samples, i.e., a data record of the received signal.

Operational block 405 causes central control 101 to transmit program D, as set out above, to test unit 102. Program D controls setting of line configuration unit 211 to a specific impedance similar to that of line configuration unit 202; sets output attenuator 210 to a specific value; selects a 1-tone signal in test signal storage and select unit 220, a 1016 Hz signal stored in digital form in PROM 222; and controls DAC 208 to continuously generate the 1-tone, 1016 Hz signal from the digital information stored in PROM 222.

Operational block 406 causes central control 101 to transmit a command to test unit 102, instructing it to execute program D and, then, the 1-tone test signal is supplied via the output port of DAU 121 to facility 105.

Operational block 407 causes central control 101 to transmit a command to test unit 103, instructing it to execute program B.

Operational block 408 causes central control 101 to transmit a command to test unit 103, instructing it to execute program C. Thus, test unit 103 is obtaining a noise data record of the received 1-tone test signal, in this example, the number (Y) of records is 1.

Operational block 409 causes central control 101 to transmit a command to test unit 103, instructing it to transmit a noise data record to central control 101.

Conditional branch point 410 tests to determine whether N noise data records have been transmitted, in this example, N=6. If the test result is "yes," control is transferred to operational block 411. However, if the test result is "no," control is transferred to operational block 408, and the operations of blocks 408 and 409 are iterated until conditional branch point 410 yields a "yes" test result.

Operational block 411 causes central control 101 to transmit a command to test unit 102, instructing it to terminate program D, i.e., to stop transmitting the 1-tone signal. Control is thereafter transferred to operational block 412.

Operational block 412, 413, 414 and 415 are identical to operational blocks 401, 402, 403 and 404, respectively.

Operational block 416 causes central control 101 to transmit program E, as set out above, to test unit 102. Program E contains instructions identical to those in program D, except that a 3-tone test signal is selected in test signal storage and select unit 220, namely, digital samples stored in PROM 223, and causes DAC 208 to continuously generate a 3-tone test signal.

Operational block 417 causes central control 101 to transmit a command to test unit 102, instructing it to execute program E and, then, the 3-tone signal is supplied via the output port of DAU 121 to facility 105.

Operational blocks 418, 419, 420 and 421 are identical to operational blocks 407, 408, 409 and 410, respectively described above, except that number N of distortion data records to be transmitted, in this example, is 12. Once N=12 distortion data records have been transmitted to central control 101, control is transferred to operational block 422, which causes central control 101 to transmit a command to test unit 102, instructing it to terminate program E, i.e., stop transmitting the 3-tone signal.

Thereafter, the program routine is exited via oval 423.

The number (N) of data records utilized in a particular test is selected to obtain a desired overall accuracy of measurement between successive measurement results; in this example from experimental practice, it is desired to have a maximum variation for all system errors of 1 dB.

In the test procedure to be described below, second and third order intermodulation distortion products are obtained employing the data obtained in the above procedure.

The second order intermodulation distortion products in this example are:

| Second Order Products | Channel | Frequency (Hz) |
|---|---|---|
| A + B | 142 | 2218.75 |
| A + B + 3Δ | 145 | 2265.625 |
| B − A | 32 | 500. |
| B − A + 3Δ | 35 | 546.875 |

The third order intermodulation distortion products in this example are:

| Third Order Products | Channel | Frequency (Hz) |
|---|---|---|
| 2B − A | 119 | 1859.375 |
| 2B − A + 3Δ | 122 | 1906.25 |
| 2B − A + 6Δ | 125 | 1953.125 |

It should be noted that when employing the 3-tone signal, namely, tones A, B and B+3Δ, as described above, the desired measurements of intermodulation distortion products are obtained, in part, by summing of the power occurring in prescribed channels of the power spectrum. Because of Hanning in the procedure of obtaining the distortion products to be described below, the power of a particular tone or tone products is substantially in three frequency channels. The expected channel and the adjacent upper and lower channels thus, for example, the power of the A+B second order products, is the sum of the powers found in channel 142, the expected channel; channel 141, the lower adjacent channel; and channel 143, the upper adjacent channel. Thereafter, a measure of second order products is obtained by summing all of the powers of the products indicated above and dividing by 2. Similarly, a measure of third order distortion products is obtained by summing all of the power found in the third order channels listed above.

The program flowchart and listings discussed below are descriptions of the set of electrical control signals that serve to configure the apparatus of FIG. 1 into a test system for obtaining the desired measure of intermodulation distortion products employing the unique 3-tone test signal and, additionally, for obtaining compensated distortion test results by taking into account the power spectrum obtained by measuring noise with tone.

The program functions described below are, for the most part, included as subroutines in the H-P 5451B Fourier Analyzer Software System noted above.

Thus, once noise and distortion data records obtained as described above are stored on disc memory in computer 110, they are utilized to obtain a measure of intermodulation distortion products. When it is desired to have test results compensated for system noise, the procedure is first to obtain the power spectrum of noise with tone.

A list of electrical control signals, which configures computer 110 into an arrangement for obtaining a measure of the noise power spectrum, is set out in the following program listing:

| NOISE WITH 1016 Hz TONE | | | |
|---|---|---|---|
| POSITION DISC TO: | | | |
| FIRST NOISE DATA RECORD FROM TEST UNIT 103. | | | |
| PROGRAM: | | | |
| 1 L | φ | | |
| 4 CL | 1 | | |
| 7 L | 1 | | |
| 1φ MS | 11 | | φ LOADS NEXT NOISE DATA RECORD INTO BLOCK φ. |
| 14 H1 | | | HANNS BLOCK φ. |
| 16 F | | | |
| 18 −* | | | MULTIPLIES BLOCK φ BY ITS COMPLEX CONJUGATE. |
| 20 A+ | 1 | | ADDS BLOCK 1 TO BLOCK φ AND |
| 23 X> | 1 | | STORES RESULT IN BLOCK 1. |
| 26 # | 1 | N | REPEAT LINES 7 THRU 20 |
| 30 : | 1 | N | N TIMES AND AVERAGE, N = 6. |
| 34 MS | 31 | 288 | |
| 38 MS | 21 | 1 | STORES RESULTS ON DISC. |
| 154 . | | | END. |
| RESULTS: | | | |
| POWER SPECTRUM OF FLAT NOISE IS STORED ON RECORD 288 OF DISC. | | | |

Then, a list of electrical control signals, which serve to configure computer 110 into an arrangement for obtaining measures of second and third order distortion products, is set out in the following program listing:

| INTERMODULATION DISTORTION | | | |
|---|---|---|---|
| MEASURE FIRST: | | | |
| NOISE WITH 1016 Hz TONE. | | | |
| POSITION DISC TO: | | | |
| FIRST DISTORTION DATA RECORD FROM TEST UNIT 103. | | | |
| PROGRAM: | | | |
| 1 L | φ | | |
| 4 CL | 1 | | |
| 7 L | 1 | | |
| 1φ MS | 11 | φ | LOADS NEXT DATA DISTORTION RECORD INTO BLOCK φ. |
| 14 H1 | | | HANNS BLOCK φ. |
| 16 F | | | |
| 18 −* | | | MULTIPLIES BLOCK φ BY ITS COMPLEX CONJUGATE. |
| 20 A+ | 1 | | ADDS BLOCK 1 TO BLOCK φ & |
| 23 X> | 1 | | STORES RESULT IN BLOCK 1. |
| 26 # | 1 | N | REPEAT LINES 7 THRU 20 |
| 30 : | 1 | N | N TIMES AND AVERAGES, |
| 34 L | 2 | | N = 12. |
| 37 X< | 1 | | |
| 40 MS | 31 | 288 | LOADS NOISE POWER SPECTRUM |
| 44 MS | 11 | 1 | INTO BLOCK 1 FROM DISC. |
| 48 A− | 1 | | SUBTRACTS NOISE SPECTRUM. |
| 51 CL | φ | 1 | CLEARS OUT DC COMPONENT. |
| 56 CL | φ 63 | 67 | CLEARS OUT HOLDING TONE. |
| 61 X> | 2 | | |
| 64 CL | φ 37 | 14φ | COMPUTES A + B & B − A |
| 69 $ | φ 31 | 146 | DISTORTION PRODUCTS & |
| 74 ← | φ 146 | | PUTS RESULT INTO CHNL φ. |
| 78 CL | φ 1 | 256 | |
| 83 : | φ | 2 | AVERAGES A + B & B − A PRODUCTS. |
| 87 X> | 1 | | |
| 90 X< | 2 | | |
| 93 $ | φ 118 | 126 | COMPUTES 2B-A |

-continued

| | | INTERMODULATION DISTORTION | |
|---|---|---|---|
| 98 ← | φ | 125 | DIST PRODUCTS |
| 102 CL | φ | φ | φ & PUTS RESULT |
| 107 CL | φ | 2 | 256 IN CHNL 1. |
| 112 A+ | 1 | | PUTS 2ND & 3RD ORDER DIST IN SAME BLOCK. |
| 115 CL | 2 | 57 | 85 COMPUTES RECEIVED |
| 120 $ | 2 | 54 | 91 POWER LEVEL |
| 125 ← | 2 | 91 | OF 3 TONES THAT |
| 129 CL | 2 | 1 | 256 WERE TRANSMITTED. |
| 134 $ | 2 | | |
| 137 : | 2 | | REFERENCES DIST TO 3-TONE POWER. |
| 140 MS | 31 | 294 | |
| 144 MS | 21 | φ | STORES 2ND & 3RD ORDER ON DISC. |
| 148 . | | | END. |

RESULTS:
2ND & 3RD ORDER DIST RESULTS ARE STORED ON RECORD 294 OF DISC.

The program listings, and hence operation of computer 110, are more readily understood with the aid of the following chart shown in FIG. 5. Accordingly, the program routine is entered via oval 500; thereafter, control is transferred to operational block 501.

Operational block 501 operates to clear block 1 in core memory of computer 110.

Operational block 502 causes computer 110 to load one of the noise data records from disc into block φ of core memory.

Operational block 503 causes computer 110 to Hann the data in block φ of core memory. As is well known, Hanning is a time-weighted function employed to minimize so-called "leakage" in the data. As will be apparent when a data input is not periodic in nature, with respect to the sampling interval, so-called leakage can occur.

Operational block 504 causes computer 110 to transform the data in block φ from the time domain into the frequency domain.

Operational block 505 causes the frequency domain data in block φ to be multiplied by its complex conjugate. This generates the power spectrum.

Operational block 506 causes the data in block 1 to be added to the data in block φ and to store the results in block 1.

Operational block 505 and 506 essentially generate a running measure of the total power spectrum.

Conditional branch point 507 performs a test to determine if another noise data record is stored on disc memory. If the test result is "no," control is transferred to operational block 508; if the test result is "yes," control is again transferred to operational block 502 and steps 502 through 507 are repeated until a "no" result is obtained.

Operational block 508 causes the running total power spectrum value stored in block 1 to be divided by the number N of noise data records, in this example, 6, and to store the result for later use. This operation results in obtaining the average noise with tone power spectrum.

Program steps 509 through 516 are identical to program steps 501 through 508, except that distortion data records are employed to obtain the average 3-tone test power spectrum and that the number of records being averaged is 12, in this example.

Operational block 517 causes the average noise spectrum to be subtracted from the 3-tone spectrum. This compensates for system noise in the test results.

Operational block 518 causes second order distortion products to be computed from the resulting compensated power spectrum. This is achieved, as indicated in the above listing at lines 64 through 83, by summing up the power in the appropriate frequency channels beginning with channel 31 through channel 146. Thereafter, the result is divided by 2 and again by the total power at the A and B frequencies, namely, appropriate channels from 54 through 91.

Operational block 519 causes third order distortion products to be obtained from the resulting compensated power spectrum, as indicated in lines 93 and 98 of the above listing, by summing the power in appropriate frequency channels, beginning with channel 118 through 126 and by dividing the result by the total power at the A and B frequencies, namely, appropriate channels from 54 through 91.

Operational block 520 causes dB values of the second and third order distortion products to be computed and displayed.

The routine is exited via oval 521.

We claim:

1. Apparatus (FIG. 1) for obtaining a measure of nonlinear distortion of a communications facility (105) of the type including means for obtaining measurements of second order intermodulation distortion products and third order intermodulation products by transmitting test signals on the facility (105), CHARACTERIZED BY, means (FIG. 2, 220, 222, 208, 209, etc.) for generating a first test signal (3-tone) to be applied to the communication facility (105) including first (A), second (B) and third (B+3Δ), tones, having predetermined amplitudes, a prescribed one of said tones having an amplitude in predetermined relationship to, and different from, the amplitudes of remaining ones of said tones, to obtain a test signal having a prescribed amplitude density function.

2. Apparatus as defined in claim 1 wherein said prescribed one of said tones has an amplitude lower in magnitude than the amplitudes of said remaining ones of said tones.

3. Apparatus as defined in claim 1 wherein said amplitude density function is substantially Gaussian.

4. Apparatus as defined in claim 1 further characterized by means (220, 223, 208, 209, etc.) for generating a second test signal (1-tone) to be applied to said communication facility (105) including a single tone, means (FIG. 1) for obtaining first and second power spectrums (FIG. 5 and FIG. 4) of said first (3-tone) and second (1-tone) test signals, respectively, after propagation over said communication facility (105), means for combining said first and second power spectrums (FIG. 5, 517) to obtain a compensated power spectrum, and means for obtaining a measure of second order intermodulation distortion products (FIG. 5, 518) and third order intermodulation distortion products (FIG. 5, 519) from said compensated power spectrum.

5. Apparatus as defined in claim 1 wherein said first tone (A) has a predetermined first amplitude, first frequency (for example, 859.375 Hz) and first phase (for example, 0 degrees); said second tone (B) has a predetermined second amplitude, second frequency (for example, 1359.375 Hz), and second phase (for example, 90 degrees); and said third tone (B+3Δ) has a predetermined third amplitude, third frequency (for example, 1406.25 Hz) and third phase (for example, 180 degrees).

6. The apparatus as defined in claim 5 wherein said first and second amplitudes are equal and said third amplitude is lower in magnitude than said first and second amplitudes, thereby obtaining a substantially optimum Gaussian amplitude density function.

7. Apparatus as defined in claim 6 wherein said second and third frequencies are relatively close, forming a tone pair, and said first frequency is relatively distant from said tone pair.

8. Apparatus as defined in claim 6, further characterized by means (220, 223, 208, 209, etc.) for generating a second test signal (1-tone) to be applied to said communication facility (105) including a single tone, means (FIG. 1) for obtaining first and second power spectrums (FIG. 4 and FIG. 5) of said first (3-tone) and second (1-tone) test signals, respectively, after propagation over said communication facility (105), means for combining said first and second power spectrums (FIG. 5, 517) to obtain a compensated power spectrum, and means for obtaining a measure of second order intermodulation distortion products (FIG. 5, 518) and third order intermodulation distortion products (FIG. 5, 519) from said compensated power spectrum.

9. Apparatus as defined in claim 6 wherein said third amplitude is at least 3 dB lower in magnitude than said first and second amplitudes.

10. Apparatus as defined in claim 9 wherein said first frequency is 859.375 Hz, said second frequency is 1359.375 Hz and said third frequency is 1406.25 Hz, and wherein said first phase is 0 degrees, said second phase is 90 degrees and said third phase is 180 degrees.

* * * * *